(12) United States Patent
Sugioka

(10) Patent No.: US 7,377,107 B2
(45) Date of Patent: May 27, 2008

(54) COGENERATION SYSTEM

(75) Inventor: Tetuo Sugioka, 1595-19 Higashihirajima, Okayama, Okayama (JP) 7090631

(73) Assignee: Tetuo Sugioka, Okayama (JP)

( * ) Notice: Subject to any disclaimer, the term of this patent is extended or adjusted under 35 U.S.C. 154(b) by 433 days.

(21) Appl. No.: 10/544,492

(22) PCT Filed: Feb. 3, 2004

(86) PCT No.: PCT/JP2004/001081

§ 371 (c)(1),
(2), (4) Date: Aug. 4, 2005

(87) PCT Pub. No.: WO2004/070187

PCT Pub. Date: Aug. 19, 2004

(65) Prior Publication Data

US 2006/0213196 A1 Sep. 28, 2006

(30) Foreign Application Priority Data

Feb. 5, 2003 (JP) ............................. 2003-028483

(51) Int. Cl.
*F01B 29/10* (2006.01)
(52) U.S. Cl. .............................. 60/524; 60/525; 60/517
(58) Field of Classification Search ........... 60/517–526
See application file for complete search history.

(56) References Cited

U.S. PATENT DOCUMENTS 1,895,082 A * 1/1933 Montero ...................... 60/526

(Continued)

FOREIGN PATENT DOCUMENTS

JP 57-086546 5/1982

(Continued)

OTHER PUBLICATIONS

Yoshihiko Tago, "The Next Generation of Power from Japan" Dec. 10, 2002, pp. 102, 105-106, 110-111, 113, 114-115, 118-119, 121 and 126-127, together with an English translation of the same.

*Primary Examiner*—Hoang M Nguyen
(74) *Attorney, Agent, or Firm*—McGuireWoods LLP

(57) ABSTRACT

A Stirling engine-equipped cogeneration system is capable of utilizing thermal energy, without waste, and of offering high thermal usage efficiency at every stage of the thermal energy utilization process. The system includes a combustion chamber (11), a burner unit (5) installed to the combustion chamber, the burner unit driving combustion to generates exhaust gas within the combustion chamber, a liquid media jacket (21) that envelopes the combustion chamber, a liquid media flowing within the liquid media jacket and absorbing thermal energy from the burner-generated exhaust gas, a Stirling engine (4) operating from a sealed operating fluid heated by the heater (3) which is located within the combustion chamber facing the burner and subjected to the flow of exhaust gas generated within the combustion chamber, an exhaust gas flow channel (20) through which flows burner-generated exhaust gas after having flowed through and heating the heater, and an exhaust gas passage (22) having an entrance connected to the exhaust gas flow channel as means of allowing the exhaust gas to heat the liquid medium in the liquid media jacket. The exhaust gas generated from the burner-driven combustion flows into the heater to transfer thermal energy thereto, then flows into the exhaust gas passage, through the exhaust gas flow channel to transfer the thermal energy to the liquid medium, thereby heating the liquid medium and heater simultaneously.

32 Claims, 7 Drawing Sheets

U.S. PATENT DOCUMENTS 5,755,100 A * 5/1998 Lamos .................. 60/521

FOREIGN PATENT DOCUMENTS

| | | |
|---|---|---|
| JP | 58-124047 | 7/1983 |
| JP | 04-116254 | 4/1992 |
| JP | 4-62337 | 5/1992 |
| JP | 05-248309 | 9/1993 |
| JP | 07-279758 | 10/1995 |
| JP | 09-170493 | 6/1997 |
| JP | 3274350 | 7/1997 |
| JP | 09-272882 | 10/1997 |
| JP | 11-182820 | 7/1999 |
| JP | 2000-213418 | 8/2000 |
| JP | 2000-213419 | 8/2000 |
| JP | 2000-263062 | 9/2000 |
| JP | 2000-319673 | 11/2000 |
| JP | 2002-098325 | 4/2002 |
| JP | 2003-055672 | 2/2003 |
| JP | 2004-177096 | 6/2004 |

* cited by examiner

COGENERATION SYSTEM

TECHNICAL FIELD

The invention relates to a Stirling engine-equipped cogeneration system that does not waste thermal energy, and that offers superior energy utilization characteristics.

BACKGROUND ART

The invention relates to Stirling engine-equipped cogeneration system of the type, for example, disclosed in Related Art References (Tokkyo bunken) 1 and 2.

Related Art Reference 1 discloses a cogeneration system assembled from a hydrogen storing heat pump and a Stirling engine equipped with an electrical generator wherein the heater part of the Stirling engine includes a heat-generating fuel-combusting burner located at the center of the upper surface of the combustion case, and further includes combustion air passages being located at the upper wall of the combustion case and leading from an external region to the flame orifice of the burner. In this cogeneration system, the thermal energy lost from the burner is 15% of the total (100%) input thermal energy.

Related Art Reference 2 describes a cogeneration system using a composite Stirling and Rankine cycle and driving a compressor that heats low-temperature steam and an electrical generator by the operation of Stirling engine. The heater of the Stirling engine is heated by air fed in from an air inlet port and heated by the combustion operation of the heat-generating burner, said heated air then being applied to a heat exchanging operation with air fed in from the air inlet port.

[Related Art Reference (Tokkyo bunken) 1]: Japanese Patent Laid-open (Kokai) Publication No. H7-279758 [pages 3-5, FIG. 1 and FIGS. 6-8]

[Related Art Reference (Tokkyo bunken) 2]: Japanese Patent Laid-open (Kokai) Publication No. 2000-213418 [pages 3-5, FIG. 1 and FIG. 5]

Both of the above-noted conventional cogeneration systems employ a dedicated heating device to supply thermal energy to the Stirling engine heater, use the output of the Stirling engine to generate electricity from an electrical generator, and also use the obtained thermal energy to drive a hydrogen storing heat pump and compressor through a driving structure, thus they employ a mechanical structure to derive power from thermal energy. This structure wastes a large amount of the thermal energy generated by the thermal source, and therefore these cogeneration systems cannot be said to use thermal energy efficiently.

DISCLOSURE OF THE INVENTION

The inventor, in consideration of the above-noted shortcoming, puts forth a Stirling engine-equipped cogeneration system able to completely utilize thermal source energy with superior efficiency at the thermal energy utilization process.

The cogeneration system invention includes a combustion chamber; a burner which is installed to the combustion chamber and induces an exhaust gas-generating combustion process within the combustion chamber; a liquid medium jacket which envelopes the combustion chamber and contains a liquid medium flowing therein, the liquid medium being heated by the exhaust gas generated by the burner; a Stirling engine which has a heater installed within the combustion chamber and disposed in opposite to the burner so as to be struck by the flow of exhaust gas in the combustion chamber, and is operated by means of being supplied a thermal energy from the heater to an operating fluid sealed therein; an exhaust gas flow channel which discharges exhaust gas flowing toward the heater from the burner and supplying the thermal energy to the heater; and an exhaust gas passage which has an inlet connected to the exhaust gas flow channel and directs the flow of exhaust gas along the liquid medium jacket, wherein the exhaust gas generated by the burner-driven combustion flows against the heater in order to transfer the thermal energy thereto, and flows into the exhaust gas passage, via the exhaust gas flow channel, in order to transfer the thermal energy to the liquid medium, thereby providing a mechanism through which the exhaust gas is able to simultaneously transfer the thermal energy to the heater and liquid medium in order.

The cogeneration system invention is able to operate at an extremely low level of thermal loss due to the below-noted structures and processes. The Stirling engine heater is installed within the combustion chamber which is heated by the burner-driven combustion, the liquid medium jacket envelopes the combustion chamber, and the exhaust gas generated by the burner-driven combustion flows against and heats the Stirling engine heater which is disposed in opposition to the burner. Further, the exhaust gas also flows through the exhaust gas flow channel into the exhaust gas passage where it is applied to heat the liquid medium in the liquid medium jacket, thus allowing the liquid medium and heater to be simultaneously heated from a single combustion chamber. The heater and liquid medium, both which may be applied to a thermal utilization process, are heated with a high level of efficiency without the thermal losses which would otherwise occur if the thermal energy were to be transferred through space, over time, or by mechanical means.

It is preferable that a casing is provided as means of enclosing at least the heater of the Stirling engine and defining at least one of spaces forming the combustion chamber.

It is preferable that an electrical generator is connected to an output shaft of the Stirling engine.

It is preferable that a supply device is connected to the liquid medium jacket as means of supplying the heated liquid medium to a thermal energy utilization process.

It is preferable that a heat absorbing and discharging thermal accumulator is installed within the combustion chamber.

It is preferable that the thermal accumulator is disposed in opposition to the burner as means of allowing a burner flame and exhaust gas emitted from the burner-generated combustion to strike the thermal accumulator.

It is preferable that a constricting part is installed in the combustion chamber to accelerate the flow of exhaust gas blown against the heater.

It is preferable that the Stirling engine is equipped with a regenerator as means of cooling the operating fluid, and that a coolant heated by the operating fluid through the operation of the regenerator heats the liquid medium.

It is preferable that an open and closable door is installed to the combustion chamber as means of selectively exposing or sealing an internal region of the combustion chamber.

It is preferable that the burner is attached to the door.

It is preferable that a removable lid is attached to the combustion chamber, and that the heater of the Stirling engine is attached to the lid.

It is preferable that various types of virgin oils, liquid refuse, waste gasses, solid waste materials, biomass fuels, or mixtures of any or all of these substances are used as fuel for the burner.

It is preferable that all types of virgin oils, liquid refuse, waste gasses, solid waste materials, biomass fuels, or mixtures of any or all of these substances are used as a base fuel material to which water is added in order to make an aqueous emulsion fuel for supply to the burner.

It is preferable that the aqueous emulsion fuel is supplied to the burner from a fuel preparation unit, the fuel preparation unit including a mixing and storing tank incorporating an agitator which agitates and mixes the base fuel material with water and a surfactant; an emulsifier which emulsifies the liquid mixture supplied from the mixing and storing tank; an ionizing unit that ionizes water molecules in the liquid mixture supplied from the emulsifier; and a pump that circulates the liquid mixture from the mixing and storing tank to the emulsifier, then to the ionizing unit, and then back to the mixing and storing tank.

It is preferable that an exhaust gas system of another process is connected to the burner as means of re-combusting an exhaust gasses generated by another process.

It is preferable that the exhaust gas system is structured of two duct systems, one duct system being connected directly to the burner, and the other duct system being connected to the burner through a washing device which removes soot and ash from the exhaust gas.

It is preferable that a combustion gas supplied to the burner is in the form of a pure oxygen gas or an oxygen rich gas.

It is preferable that the fuel supplied to the burner is in the form of a mixture of oxygen and hydrogen gas.

It is preferable that the burner includes an igniter; a nozzle with a spraying end that separately sprays out fuel and a primary gas which mix at a location external to the spraying end; a secondary gas supply system that sprays a secondary gas into a mixture of fuel and primary gas as means of imparting a spinning motion to the mixture of fuel and primary gas; a gasification duct that gasifies the fuel in the spinning mixture of primary gas and fuel flowing therethrough; and an oxidizing gas supply passage which supplies oxidizing gas to an outlet of the gasification duct in order to ignite and combust the fuel.

It is preferable that the burner includes a double wall cylindrical structure at the spraying end of the nozzle, the cylindrical structure being formed from an inner cylinder enclosed within an outer cylinder, the gasification duct being formed as a space within the inner cylinder, and the oxidizing gas supply passage being formed as a space within the outer cylinder.

It is preferable that an exhaust gas heating furnace is installed to the exhaust gas system.

It is preferable that the heating furnace is equipped with a combustion chamber through which exhaust gas flows, and a burner which is installed within the combustion chamber as means of combusting and heating the exhaust gas.

It is preferable that the fuel supplied to the burner is any type of virgin oils, a liquid state waste product, a gas state waste product, a solid state waste product, biomass fuel, or a mixture of any or all of these substances.

It is preferable that the fuel supplied to the burner is any type of virgin oils, a liquid state waste product, a gas state waste product, a solid state waste product, biomass fuel, or a mixture of any or all of these substances used as a base fuel to which water is added to make an aqueous emulsion fuel.

It is preferable that a combustion gas supplied to the burner is a pure oxygen gas or an oxygen rich gas.

It is preferable that the fuel supplied to the burner is a mixture of oxygen and hydrogen gas.

It is preferable that the heating furnace is equipped with a Stirling engine which has a heater installed within the combustion chamber and operates from a thermal energy supplied by the heater heated by the burner-driven combustion, an output shaft of the Stirling engine being connected to an electrical generator.

It is preferable that a constricting part is installed within the combustion chamber as means of accelerating the flow of exhaust gas therein against the heater.

It is preferable that a removable lid is attached to the heating furnace, and that the heater of the Stirling engine is attached to the lid.

It is preferable that an exhaust gas heating thermal plant is installed to the exhaust gas system, the thermal plant comprising a plurality of heating furnaces mutually interconnected by ducts in an inline configuration.

It is preferable that the thermal plant, in addition to the ducts interconnecting a plurality of heating furnaces in the inline configuration, is equipped with bypass ducts, each bypass duct bypassing each heating furnace.

It is preferable that the heating furnace is equipped with a Stirling engine which has a heater to be heated and operates from a thermal energy supplied by the heater, an output shaft of the Stirling engine being connected to an electrical generator.

BRIEF DESCRIPTION OF THE DRAWINGS

The present invention is further described in the detailed description which follows, with reference to the below-noted plurality of drawings representing non-limiting examples of exemplary embodiments of the present invention in which like reference numerals represent similar parts throughout the several views of the drawings, and wherein.

BEST MODE FOR CARRYING OUT THE INVENTION

Figure 1:
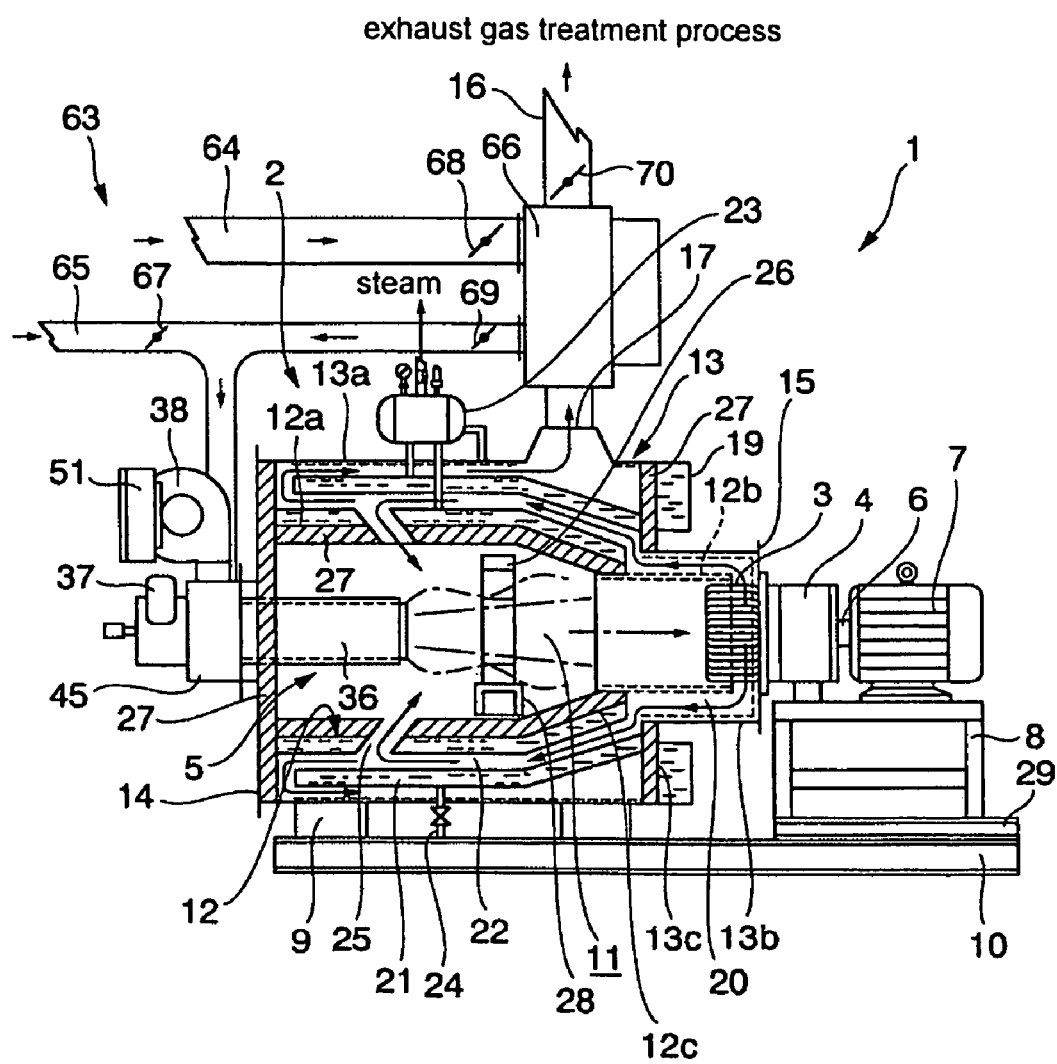
FIG. 1 is a cross section of a preferred embodiment of the cogeneration system invention.
Figure 2:
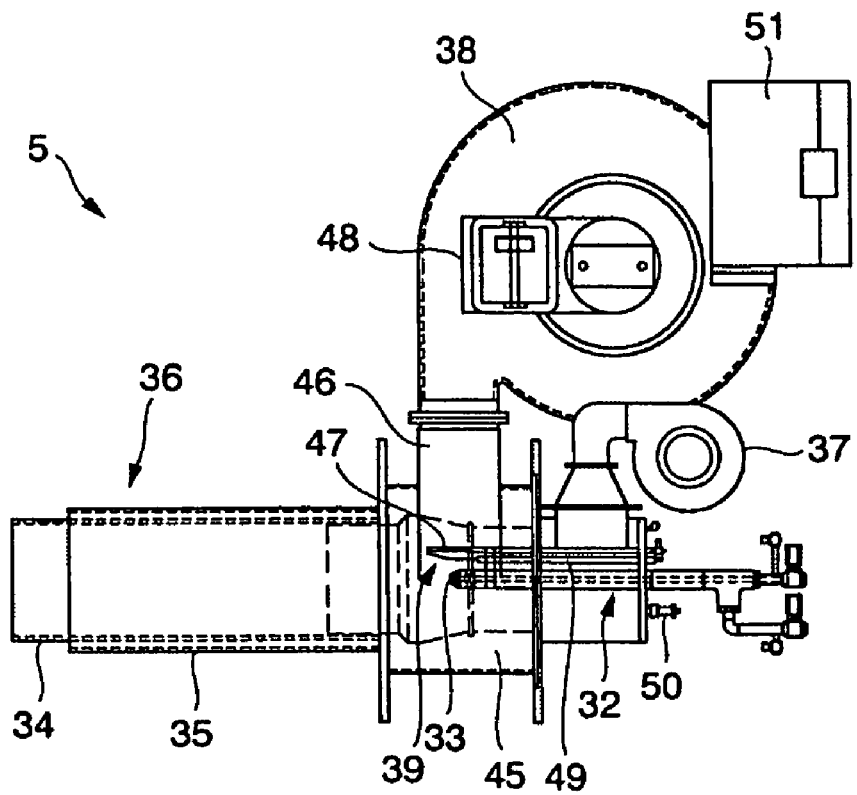
FIG. 2 is a side view of the burner used by the FIG. 1 cogeneration system.
Figure 3:
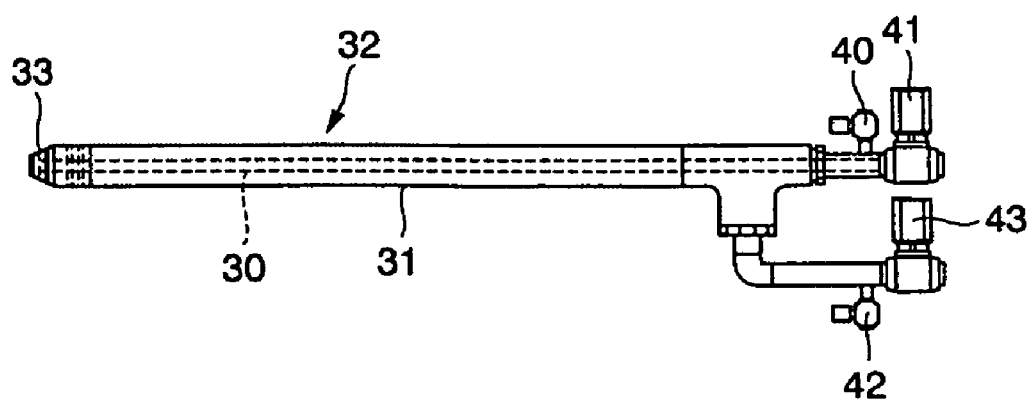
FIG. 3 is a side view of the double-wall pipe of the FIG. 2 burner.

The following provides a detailed description of the preferred embodiments of the cogeneration system invention with reference to the attached figures. This embodiment of the cogeneration system 1, which is illustrated in FIG. 1, is primarily structured from boiler 2 which uses exhaust gas to heat a liquid medium [i.e., water] and extract thermal energy therefrom, Stirling engine 4 which includes heater 3 and which operates from a sealed operating fluid heated by heater 3, and burner unit 5 that serves as the thermal source from which thermal energy, that is, combustion flames, the thermal radiation from those flames, and combustion-generated exhaust gas, is supplied to boiler 2 and heater 3 of Stirling engine 4. Output shaft 6 of Stirling engine 4 is connected to electrical generator 7 as means of converting thermal energy generated by heater 3 into electricity.

Stirling engine 4, electrical generator 7, and boiler 2 are mounted in a horizontal orientation to frame 10, Stirling engine 4 and electrical generator 7 through framework 8, and boiler 2 through mounting leg 9. Burner unit 5 is also installed in a horizontal orientation. These components may, of course, also be disposed in a vertical orientation.

Boiler 2 is equipped with inner cylinder 12 which forms a partitioned region within combustion chamber 11 in which the air from burner unit 5 is combusted, outer cylinder 13 which envelopes the outside of inner cylinder 12 and forms the outer shell of boiler 2, and a pair of left and right end plates 14 and 15 which are installed at the left and right ends of outer cylinder 13 and internal cylinder 12 to seal combustion chamber 11. Burner unit 5 and Stirling engine 4 are disposed at the respective left and right sides of boiler 2, thus sandwiching boiler 2 therebetween. Burner unit 5 is attached to left end plate 14, and heater 3 of Stirling engine 4 is attached to right end plate 15, thus orienting burner unit 5 and heater 3 in mutual opposition inside of combustion chamber 11, such disposition allowing heater 3 to be heated by combustion from burner unit 5.

To be more specific, boiler 2 includes outer cylinder 13 having large diameter part 13a on the left side which is the burner unit 5 side, and small diameter part 13b on the right side which is the Stirling engine 4 side, parts 13a and 13b being integral components of a single structure. Large diameter part 13a is equipped with exhaust discharge port 17 which is connected with exhaust duct 16 equipped with an exhaust gas processing induction fan drawing in exhaust gas and discharges exhaust gas travels toward an exhaust gas treatment process through said exhaust duct. Preheating passage 19, which is located at step wall 13c between large diameter part 13a and small diameter part 13b, preheats a liquid medium supplied to boiler 2 from a liquid supply device by means of a pump, with utilizing the thermal energy held in heat accumulator 27 (to be described subsequently).

Inner cylinder 12 includes large diameter part 12a located at large diameter part 13a of outer cylinder 13, and small diameter part 12b located at small diameter part 13b of outer cylinder 13, small diameter part 13b forming a duct structure surrounding the front end of heater 3. Large diameter part 12a and small diameter part 12b are formed as separate components.

Cone 12c forms a continuously narrowing passage extending from the right side of large diameter part 12a toward small diameter part 12b. The left end of small diameter part 12b inserts into cone 12c to form a continuous structure that accelerates the exhaust gas generated in combustion chamber 11 as said gas travels from burner unit 5 to and around heater 3. Cone 12c may also extend from the mouth at the left end of small diameter part 12b in a continually larger diameter toward the mouth of large part 12a which has a set diameter. Annular-shaped exhaust gas flow channel 20 is formed around the perimeter of small part 12b of inner cylinder 12, and between right end plate 15 and small part 13b of outer cylinder 13, as means of discharging exhaust gas flowing into heater 3 from burner unit 5 via cone 12c.

Liquid media jacket 21 surrounds combustion chamber 11 between large diameter part 13a of outer cylinder 13 and large diameter part 12a of inner cylinder 12, and contains the flow of liquid medium heated by exhaust gas and thermal energy radiating from the inside of combustion chamber 11 as a result of the operation of burner unit 5. Also, exhaust gas passage 22 is provided as means of guiding the flow of exhaust gas to liquid media jacket 21. Liquid media jacket 21 connects to preheating passage 19 at the inlet port thereof and also connects to gas-liquid separator 23, said gas-liquid separator being a device that supplies the heated liquid medium to a thermal utilization process. Gas-liquid separator 23 separates the steam component from the liquid in liquid media jacket 21 and sends the steam component, as well as the high-temperature liquid component, to a thermal utilization process.

Therefore, the liquid medium, which is supplied to liquid media jacket 21 from the liquid supply device via preheating passage 19, is heated within liquid media jacket 21, and passes through gas-liquid separator 23 as a gas and high-temperature liquid, and from there may be supplied to any type of thermal utilization process. Moreover, Stirling engine 4, which is a known type of engine, is equipped with a regenerator which cools the Stirling engine operating fluid. The regenerator is supplied with a coolant, such as water or other like substance, which is heated as the result of a heat exchange operation with the operating fluid. In case that the coolant heated by the regenerator flows through a pipe to a 3-way switching valve which connects to two pipes, one of the pipes being connected to preheating passage 19 through a heat exchanger, and the other connected to a thermal utilization process, the operation of the 3-way switching valve makes effective usage of the thermal discharge from Stirling engine 4 possible by means of preheating the liquid medium using the heated coolant and applying the heated coolant to the thermal utilization process. Moreover, discharge drain pipe 24 is connected to liquid media jacket 21.

The inlet port of exhaust gas passage 22 connects to exhaust gas flow channel 20 in which flows exhaust gas which has previously heated heater 3, and the outlet port connects to discharge port 17 of outer cylinder large diameter part 13a. Re-circulation passage 25 branches off from exhaust gas passage 22 and is connected to combustion chamber 11 in order to re-circulate a part of the exhaust gas coming from the combustion flame draft of burner unit 5. Therefore, the exhaust gas generated from the combustion in burner unit 5 is accelerated through cone 12c, flows against and heats heater 3 which powers Stirling engine 4, and then flows through exhaust gas flow channel 20 into exhaust gas passage 22 to heat the liquid medium. One part of the exhaust gas returning to combustion chamber 11 is re-combusted, and the remaining part is sent from discharge port 17 to an exhaust gas process external to the system for further processing.

Thermal accumulators 26 and 27 are located at appropriate locations in boiler 2 in order to absorb and radiate heat from the combustion occurring in burner unit 5. Thermal accumulators 26 and 27, and especially components residing within combustion chamber 11, are made from a fire and corrosion resistant material able to withstand the combustion flames and corrosive effects of soot and ash generated from the combustion reaction taking place in burner unit 5. Moreover, inner cylinder small diameter part 12b is also made from a corrosion resistant material. In this embodiment, thermal accumulator 26 inside of combustion chamber 11 is located apart from cone 12c, close to and opposing burner unit 5 in order to have both of the combustion flame and the exhaust gas discharged from the flame of burner unit 5 strike accumulator 26. Also, heat accumulator 27 is removably attached to the inner surfaces of inner cylinder large part 12a which forms the surface of combustion chamber 11, to left end plate 14, and to the inner surfaces of step wall 13c.

Thermal accumulator 26 is structured from checker brick in which thru-holes are formed as means of preventing the obstruction of exhaust gas flowing from burner unit 5. Thermal accumulator 26 is replaceably mounted on stage 28 which is fixedly installed within combustion chamber 11. Thermal accumulators 26 and 27 become thermally saturated from the combustion in burner unit 5, and are thus able to suppress temperature fluctuations within combustion chamber 11, and to also heat, through thermal radiation, the liquid medium in liquid media jacket 21 and preheating channel 19.

In this embodiment of cogeneration system 1, the combustion flame, thermal radiation, and exhaust gas generated by the combustion in burner unit 5 in combustion chamber 11 raise the temperature of heater 3 of Stirling engine 4 as well as the temperature of the liquid medium in boiler 2 through the flow of exhaust gas into exhaust gas passage 22 through exhaust gas flow channel 20. These thermal operations are made possible without moving or transporting heat through space or time while at the same time generating both heat and electricity.

In addition, in this embodiment, left end plate 14, to which burner unit 5 is attached, is attached to boiler 2 through a hinge, thus forming a structure through which left end plate 14 functions as an opening and closing door through which the soot which accumulates in combustion chamber 11 may be removed, through which maintenance work can be conducted, and through which burner unit 5 can be taken out for inspection and maintenance at a location external to combustion chamber 11.

Right end plate 15, to which heater 3 is attached, is structured as a cover part which can be removed from outer cylinder small diameter part 13b by means of a coupling device. Moreover, framework 8, on which Stirling engine 4 and other components are mounted, is attached to frame 10 through side rail 29. The removal of end plate 15 from outer cylinder small diameter part 13b and the slidable displacement of framework 8 allow heater 3 to be pulled out of combustion chamber 11 for maintenance.

The following will describe burner unit 5 with reference to FIGS. 2, 3, 4, and 5. Burner unit 5, which was developed by the inventors of the present invention, is a dual-flow misting-type burner unit [see Japanese patent application No. 2002-382741] structured from;

double-wall pipe 32 which includes straightly formed fuel supply pipe 30 and gas supply pipe 31 which surrounds the external side of fuel supply pipe 30, gas supply pipe 31 supplying a primary gas such as air;

mixing nozzle 33 which is attached to the tip of double-wall pipe 32 and which separately sprays out fuel and a primary gas from a spray tip so as to make them mix outside thereof, said fuel and primary gas being respectively supplied through fuel supply pipe 30 and gas supply pipe 31;

double-wall cylinder 36 which provides a flame discharge orifice forward of nozzle 33, cylinder 36 being structured from inner cylinder 34 and outer cylinder 35, both cylinder 34 and 35 being round in cross section;

low-flow fan 37 and high-flow fan 38 which draw in secondary gasses such as air and the like, fan 37 being used for low combustion rates and fan 38 for high combustion rates;

igniter 39; and control unit 51 that controls the combustion process including initial ignition, combustion, and combustion quench.

Fuel supply pipe 30 includes nozzle 33 connected to its tip part, and fuel solenoids 40 and 41 connected to its base part, solenoid 40 controlling the fuel supply for a low combustion rate, and solenoid 41 being an adjustable type controlling the fuel supply for a high combustion rate. Fuel enters fuel supply pipe 30 through either solenoid 40 or 41, and is sprayed out at high pressure from nozzle 33. The tip part of gas supply pipe 31 is connected to nozzle 33, and the base part thereof is provided with gas solenoids 42 and 43, solenoid 42 controlling the supply of primary gas for a low combustion rate, and solenoid 43 being an adjustable type controlling primary gas flow for high combustion rate. Primary gas also enters gas supply pipe 31 through either solenoid 42 or 43, and is sprayed out from nozzle 33 at high pressure.

Figure 4:
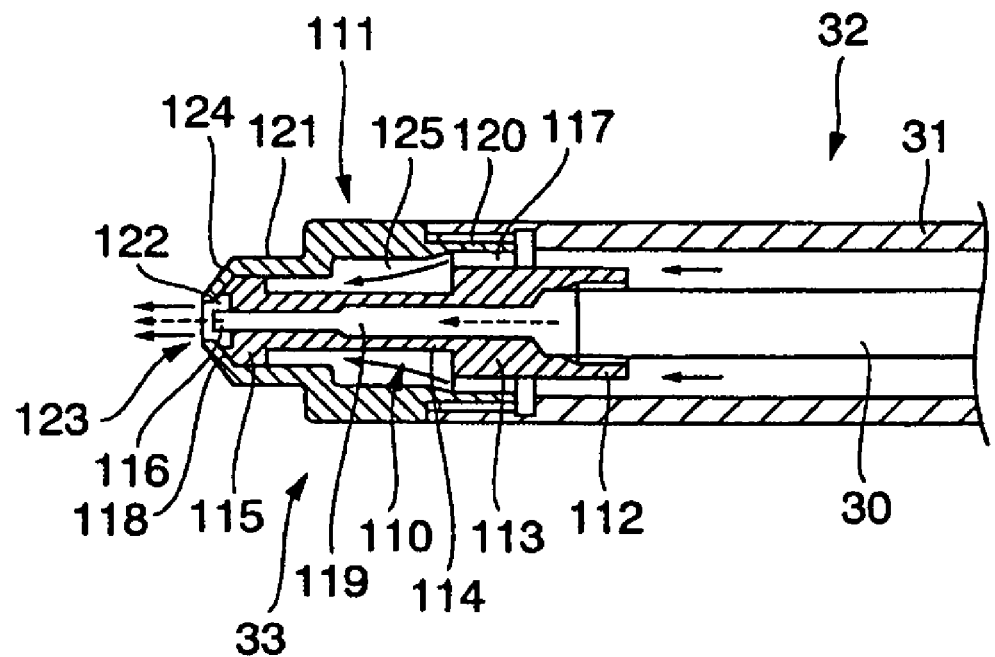
FIG. 4 is a side view cross section of the tip region of the double-wall pipe shown in FIG. 3.
Figure 5:
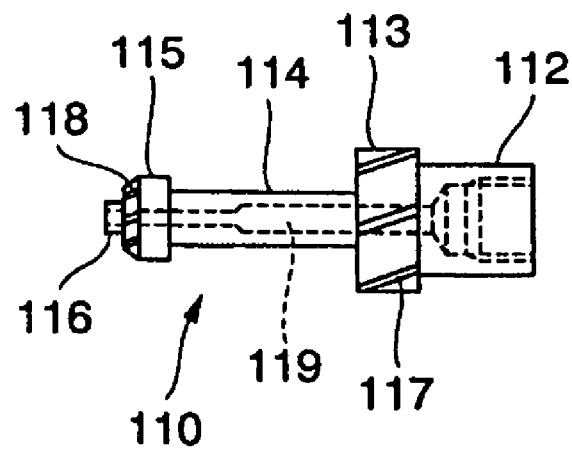
FIG. 5 is a side view of the nozzle body used by the FIG. 2 burner.

As shown in FIG. 4 and FIG. 5, nozzle 33, which is installed to the tip part of double-wall pipe 32, is primarily structured from hollow sleeve-shaped nozzle body 110 which connects to fuel supply pipe 30, and hollow sleeve-shaped nozzle cover 111 that surrounds nozzle body 110 and connects to gas supply pipe 31. Nozzle body 110 is structured from (noted in sequence from the base part to the tip part) connecting part 112 that threads into fuel supply pipe 30, first ring 113 which has a larger diameter than connecting part 112, pipe-shaped part 114 which has a smaller diameter than connecting part 112, second ring 115 which has a larger diameter than pipe-shaped part 114 but a smaller diameter than first ring 113, and fine pipe part 116 which extends beyond second ring 115.

A threaded screw part is formed on the perimeter of first ring 113 and angular slits 117 are formed at appropriate intervals along the circumferential direction thereon and incline to an axis of nozzle body 110. Having much the same configuration as the first ring 113 structure, slits 118 are formed at appropriate intervals on the cone-shaped perimeter of the tip of second ring 115 which inclines to the axis of nozzle body 110. Fuel spray passage 119 runs from connecting part 112 through fine pipe part 116 in nozzle body 110 in order to introduce fuel into fine pipe part 116 from fuel supply pipe 30 which connects to connecting part 112, whereby fuel is sprayed out from fine pipe part 116. Fuel spray passage 19 provides means of pressuring the fuel passing therethrough by being formed to a diameter that decreases along its length extending from connecting part 112 to fine pipe part 116.

Nozzle cover 111 includes, as noted in sequence from its base part to its tip part, connecting part 120 which forms a ring-shaped space around pipe-shaped part 114 of nozzle body 110, the inner perimeter of connecting part 120 threading into first ring 113 of nozzle body 110, and the outer perimeter threading into gas supply pipe 31; mid-section 121 which is formed to a smaller diameter than connecting part 120 and defines a narrow space around pipe-shaped part 114; and spray flange 124 which is formed as a tapered cone-shaped tip part covering second ring 115, defines gas spray chamber 122 around fine pipe part 116, and forms spray orifice 123, which connects to gas spray chamber 122 into which fine pipe part 116 protrudes, from which fuel and primary gas are sprayed out.

Connecting part 120 installs against and around the perimeter of first ring 113, thus forming a structure able to impart a spinning motion to the primary gas flow passing through slits 117. Passage is constructed between mid-section 121 and pipe-shaped part 114 to raise the pressure of the flowing primary gas. Spray flange 124 installs against the cone-shaped surface of second ring 115, thus forming a structure able to strengthen a spinning motion to the primary gas flow passing through slits 118. Nozzle 33 may, for example, be assembled through a structure whereby nozzle body 110 is inserted and tightened into nozzle cover 111 after which nozzle body 110 is tightened to fuel supply pipe 30 and nozzle cover 111 is tightened to gas supply pipe 31.

The gas flowing through gas passage 125 between nozzle cover 111 and nozzle body 110 (gas passage 125 being formed as a continuous passage from gas supply pipe 31 to spray orifice 123) is driven in a spinning motion by slits 117 of first ring 113 after which the pressure of the flowing gas is increased by the constricting effect applied by mid-section 121, and the spinning motion further strengthened by slits 118 of second ring 115. Finally, the fuel is sprayed out from fine pipe part 116 of nozzle body 110 and the primary gas is sprayed out from gas spray chamber 122 through spray orifice 123 as the high-speed spinning and shearing flow, whereby the fuel is mixed with and very finely atomized by the primary gas outside of nozzle 33.

Cylindrical wind box 45 is installed around the tip of nozzle 33 through which the fuel and primary gas mixture, as mixed in the previously described process, is sprayed. Inverter-controlled high-flow fan 38, which draws in secondary gas supplied to wind box 45, is joined to wind box 45 via duct arranged in the tangential direction of wind box 45. High-flow fan 38, duct 46, and wind box 45 have the function of further promoting the mixing of the fuel and primary gas mixture through a circular flow path. The induction of a secondary gas in this manner drives the mixture of fuel and primary gas (which has been sprayed out from nozzle 33) with a high-speed circular motion which has the effect of ultra-atomizing the fuel under ultra-mixture condition.

Moreover, double wall cylinder 36 is installed to the opposite side of wind box 45 from double-wall pipe 32. Inner cylinder 34 of double wall cylinder 36 forms a fuel gasification duct in which the fuel is gasified as the gas-fuel mixture moves therethrough with a spinning motion. In order to ignite and combust the fuel, outer cylinder 35 functions as an oxidation gas supply passage through which oxidation gas passes toward the exit orifice of inner cylinder 34 which extends outward from the end of outer cylinder 35. In this embodiment, outer cylinder 35 is structured to form a connecting passage to wind box 45 allowing part of the secondary gas, which serves as the oxidation gas, to flow through outer cylinder 35. Furthermore, a structure may be employed which does not limit the gasification of fuel to a mechanism thorough which the fuel is gasified after exiting nozzle 33, but which may supply previously gasified fuel, through fuel pipe 30, to be sprayed from nozzle 33.

Igniter 39 is applied to an ignition method to light a pilot flame on pilot burner 47 which is disposed parallel to double-wall pipe 32 and extends to the tip of the nozzle. In other words, pilot flame electrode 49, which is connected to pilot flame transformer 48, emits an electrical discharge that ignites a pilot flame fed by the fuel gas discharged from pilot burner 47 after which fuel sprayed out of nozzle 33 is ignited by the pilot flame. Low-flow fan 37, which is installed behind nozzle 33, supplies secondary gas at a low flow rate during a low rate combustion condition after the mixture has ignited. Light fuel oil or other like substance, or both fuel gas and light fuel oil, may be used in place of fuel gas for this purpose. Furthermore, flame sensor 50, which is installed to burner unit 5, automatically functions as a sensor for detecting an emergency, outputting a warning and sending a fault condition signal to controller 51 in order to stop the combustion operation.

To explain the operation of burner unit 5, after a pilot flame is lit at igniter 39, fuel solenoids 40 and 42 open to supply fuel and primary gas to nozzle 33 through fuel supply pipe 30 and gas supply pipe 31. Low-flow fan 37 then begins operation by blowing in a small amount of secondary gas which ignites and thus initiates low rate combustion.

Next, high rate combustion initiates by fuel solenoid 41 and gas solenoid 43 gradually opening while high-flow fan 38 blows in a larger amount of air. The secondary gas effectively intermixes with the fuel and primary gas sprayed from nozzle 33, while ultra-atomizing the fuel under the spinning motion at a high rate of speed, and sends the fuel and primary gas to inner cylinder 34 to promote the gasification of the fuel. During this process, a part of the still spinning secondary gas flows into outer cylinder 35 and is blown out from the exit orifice of double-wall cylinder 36.

The secondary gas blown out of outer cylinder 35 mixes with the gasified fuel at the exit orifice of inner cylinder 34 and combusts, thus it is created a stable, high-rate, and complete combustion condition. In particular, if water is mixed in with the fuel, it becomes possible to induce an aqueous gasification reaction within inner cylinder 34, and an oxidation reaction with the secondary gas emitted from outer cylinder 35 at the exit orifice of inner cylinder 34, thus generating an explosive combustion condition. In this high-rate combustion process, a step-less turn-down control system may be conducted through the adjustable operation of solenoids 41 and 43 and inverter controlled adjustable operation of high-flow fan 38.

Burner unit 5 may use various types of fuel including kerosene, heavy fuel oil, vegetable oil, mineral oil and the like. Fuel types are not limited to virgin oils, but may also include used oils, high water-cut oils, liquid waste, oil processed from waste plastics, biomass fuels such as wood vinegar pyroligneous acid derived from drying bamboo and so forth, and waste gases such as exhaust gas. Fuel can also take the form of liquids into which particles and powders processed from solid waste and biomass substances have been mixed, mixtures of the above-noted substances, and aqueous emulsion fuels made by mixing water into base materials made from the above-noted substances. The aqueous component of these fuels may be clean or it may contain impurities.

The use of aqueous emulsion fuels enables an aqueous gas reaction through which burner unit 5 is able to operate at high efficiency, and thus promote complete combustion which has the effect of purifying the exhaust gas. The gas supplied to burner unit 5 may, of course, be air, or it may be a combustible gas. Exhaust gases may be supplied for re-combustion as a result of the excellent combustion characteristics of burner unit 5 which is able to thermally separate fuel components at high temperatures. In addition, the structure of nozzle 33 allows the use of high viscosity fuels as well as low viscosity types.

Also, by supplying and burning a mixture of oxygen and hydrogen, the resulting high temperature inhibits the generation of toxic components and eliminates exhaust gas. Moreover, a high temperature low NOx combustion process may be ensured by using pure oxygen or an oxygen rich gas as the combustion gas and supplying it to burner unit 5 as a single gas or in combination with other gasses. A gas including oxygen and/or hydrogen components may also be combusted in addition to the above-noted substances.

Figure 6:
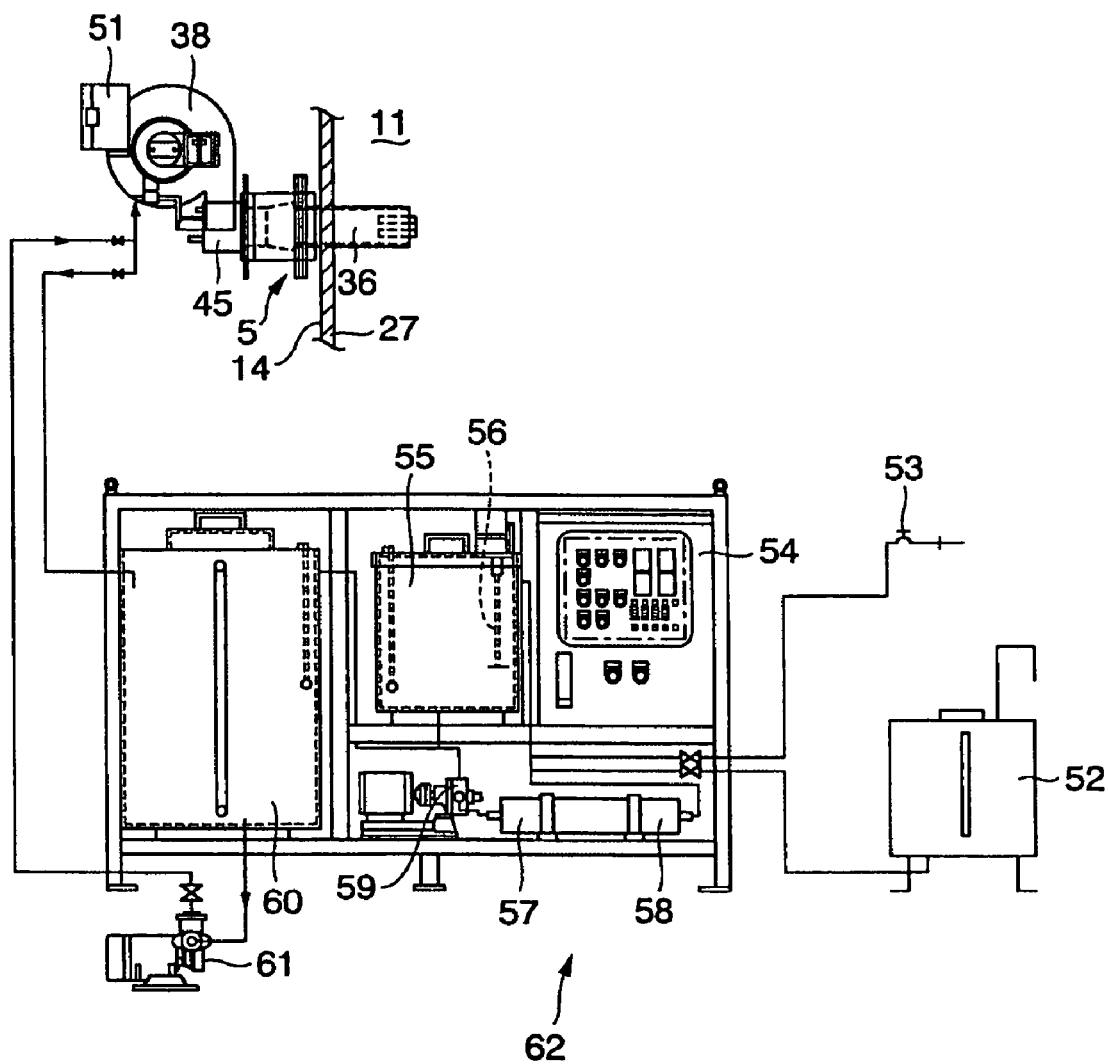
FIG. 6 is a side view of the aqueous emulsion fuel preparation unit used by the FIG. 1 cogeneration system.

The following will describe, with reference to FIG. 6, an aqueous emulsion fuel which can be supplied to burner unit 5 and combusted, and fuel preparation unit 62 which manufactures the aforesaid aqueous emulsion fuel. Aqueous emulsion fuel and fuel preparation unit 62 have been developed by the inventor of the present invention (disclosed in Japanese Patent Application No. 2001-282360). Fuel preparation unit 62 includes;

oil tank 52 which stores oil such as waste oil;

water supply valve 53 which opens and closes to adjustably control the supply of utility-supplied water to a water pipe;

a surfactant tank storing a surfactant which promotes and stabilizes emulsification;

mixing tank 55 which stores a mixture of waste oil, surfactant and water, said waste oil and surfactant being respectively supplied from adjusting valve-installed pipes connected to oil tank 52 and the surfactant tank, and said water being supplied through water supply valve 53;

agitator 56, installed to mixing tank 55, which creates a liquid mixture;

emulsifier 57 which attenuates clusters in the mixture liquid supplied from mixing tank 55 by applying a water impact process (through which the liquid mixture is broken down) and a process contacting with crystals, in order to promote emulsification of the liquid mixture;

ionizing unit 58 which generates a magnetic field of intersecting magnetic force lines to ionize the liquid component of the liquid mixture supplied from emulsifier 57;

circulation pump 59 that draws the liquid mixture from mixing tank 55 and circulates it back to tank 55 through a closed loop pipe system connecting mixing tank 55, emulsifier 57, and ionizing unit 58; and automatic controller 54 that controls the fuel emulsification process.

When preparing an aqueous emulsion fuel, one part waste oil and one part utility-supplied water are placed in mixing tank 55 along with a surfactant which is added at a volume of 0.1~0.7% of the total. While agitator 56 is operating, pump 59 circulates the mixture from mixing tank 55, under pressure, through emulsifier 57 and ionizing unit 58 which has the effect, over a period of time, of creating a stable water-fuel emulsion. This type of fuel manufacturing process is automatically controlled through automatic controller 54.

The prepared aqueous emulsion fuel is then deposited in reserve tank 60 by switching the fuel flow at the output side [emulsifier side] of pump 59 to reserve tank 60. Reserve tank 60 is connected to fuel supply pipe 30 of burner unit 5 through a pipe connected to oil pump 61 which intermittently supplies burner unit 5 with the manufactured aqueous emulsion fuel with excess fuel returning to reserve tank 60.

The surfactant may be added to the mixture through an additive unit installed between mixing tank 55 and pump 59. Also, a water holding tank may be installed with the purpose of supplying water to mixing tank 55. While this description has specified a 1:1 mixture of waste oil and water, the water component may occupy up to 90% volume of the mixture. The aqueous emulsion fuel, as prepared by this process, is slow to evaporate at normal temperatures, and is able to be transported and stored with a high level of safety due to its high ignition temperature.

This embodiment of the above-described fuel preparation unit 62, which includes emulsifier 57 and magnetic field-generating ionizing unit 58 [both of which need not be externally powered], pump 59, tanks 52, 24, 55, and 60, pipes, and other like components, is a simple structure capable of easily preparing an aqueous emulsion fuel at low cost.

Moreover, in this embodiment, exhaust gas system 63 communicated with another process is connected to high-flow fan 38 of burner unit 5 to supply the exhaust gas, as the secondary gas, to burner unit 5 from another process. This secondary exhaust gas, as has been previously described, accelerates and is mixed into the spinning flow proximal to nozzle 33, and is blown out from outer cylinder 35, to provide an exhaust gas re-combustion process.

Exhaust gas system 63 is divided into two systems, one including first exhaust gas duct 64 through which flows exhaust gas containing a large amount of soot and other foreign objects, and the second including second exhaust gas duct 65 through which flows exhaust gas containing a small amount of foreign objects. Second exhaust gas duct 65 connects directly to high-flow fan 38, and first exhaust gas duct 64 connects to high-flow fan 38 through heat exchanger 66 which is located between first exhaust gas duct 64 and exhaust duct 16 through which exhaust gas flows. Heat exchanger 66, which is disposed between exhaust duct 16 and first exhaust gas duct 64, includes an internally installed soot collector which removes solid objects from the exhaust gas flowing through first exhaust gas duct 64. Also, one of three stop valves 67 through 69 is installed on the intake side of fan 38 of second exhaust gas duct 65, and on the intake and exhaust sides of heat exchanger 66 of first exhaust gas duct 64.

Exhaust gas may be drawn through exhaust gas system 63 by high-flow fan 38 in the following manner. When exhaust gas is flowing through first exhaust gas duct 64, first stop valve 67 in second exhaust gas duct 65 is closed, and second and third stop valves 68 and 69 on the heat exchanger 66 side are open. Conversely, when exhaust gas is flowing through second exhaust gas duct 65, first stop valve 67 in second exhaust gas duct 65 is open, and second and third stop valve 68 and 69 are closed. Adjustment valve 70 is installed to exhaust duct 16 to control the discharge pressure of heat exchanger 66 so as to adjust the combustion pressure within combustion chamber 11.

To explain the operation of this embodiment of cogeneration system 1, operation starts with the ignition of burner unit 5 and the supply of fuel to burner unit 5 from fuel preparation unit 62, followed by the supply of exhaust gas, which serves as the secondary gas, from exhaust gas system 63, the supply of secondary gas resulting in burner unit 5 moving from a low combustion rate to a high combustion rate. The combustion is generated by burner unit 5, the heat is stored in thermal accumulators 26 and 27, and the exhaust gas circulating within boiler 2 transfers thermal energy to heater 3 and the liquid medium. Therefore, Stirling engine 4 begins operation when heater 3 reaches a preset temperature and electrical generator 7, which is driven by Stirling engine 4, initiates the generation of electricity while the heated liquid medium is supplied from gas-liquid separator 23 to the thermal utilization processes, this making it possible to provide two energy sources.

Cogeneration system 1 of this embodiment specifies that heater 3 of Stirling engine 4 being installed within combustion chamber 11 which is thermally energized by the combustion propagated by burner unit 5 and liquid media jacket 21 which surrounds combustion chamber 11. The exhaust gas generated by the combustion from burner unit 5 flows over and imparts thermal energy to heater 3 of Stirling engine 4 being opposite to burner unit 5, and sequentially heats the liquid medium in medium jacket 21 by flowing into exhaust gas passage 22 through exhaust gas flow channel. Because the liquid medium and heater 3 are heated within a single combustion chamber 11 at the almost same time, there is no need to provide space, time, or mechanical means to transfer thermal energy in order to heat heater 3 and the liquid medium. Therefore, thermal energy loss is reduced, heater 3 and the thermal utilization liquid medium are more efficiently heated from combustion driven by burner unit 5, and cogeneration system 1 operates without wasting energy.

In addition to high thermal utilization efficiency, this embodiment of the cogeneration system 1 combines boiler 2 and Stirling engine 4 into a single assembly which forms a more compact structure. The cogeneration system 1 is able to offer superior performance, especially when applied as a zone-type cogeneration system, due to boiler 2 and Stirling engine 4 not requiring their own heat source, and by boiler 2 and Stirling engine 4 being able to generate energy from various types of fuels that may even contain a variety of waste materials.

The cogeneration of both electrical and thermal energy is made possible by Stirling engine 4 driving electrical generator 7, and by the liquid medium being supplied to a thermal utilization process. The installation of thermal accumulators 26 and 27 (which draw in and discharge heat) within combustion chamber 11 make it possible to control temperature fluctuations in combustion chamber 11 and to stabilize the heating process through which thermal energy is transferred to heater 3 and the liquid medium at a set temperature. As a result of the flames and exhaust gas discharged from burner unit 5 striking oppositely disposed thermal accumulator 26, it becomes possible for thermal accumulator 26 to store thermal energy at the highest temperature of the combustion conducted by burner unit 5, thus allowing the maximum amount of combustion energy from burner unit 5 to be transferred to heater 3 and the liquid medium.

Even though both the liquid medium and heater 3 are heated through a single combustion chamber 11 simultaneously, the exhaust gas is effectively collected and supplied to heater 3 through cone 12c which is disposed in opposition thereto, thus forming a mechanism through which thermal energy is efficiently transferred to heater 3, and through which the efficient operation of Stirling engine 4 can be maintained at temperatures from 750~800° C. Moreover, the coolant heated by the operation of the regenerator of Stirling engine 4 may be applied to heat the liquid medium or may be supplied to the heat utilization process. This process allows the heat discharged by Stirling engine 4, that is, part of the heat originating from the combustion within burner unit 5, to also be applied as the thermal energy to further increase the utilization of thermal energy from burner unit 5.

Left end plate 14, which also functions as a door, may open to allow access to the internal region of combustion chamber 11 from which accumulated soot may be easily removed and in which other maintenance operations may be conducted. Moreover, the attachment of burner unit 5 to end plate 14 results in burner unit 5 swinging out of combustion chamber 11 when end plate 14 is opened, thus allowing convenient maintenance of burner unit 5. Conversely, right end plate 15 functions as a lid to which heater 3 of Stirling engine 4 is attached, the removal of end plate 15 exposing heater 3 to the external environment for convenient maintenance and repair work.

The fuel supplied to burner unit 5 may take the form of various types of virgin oils, liquid waste products, gaseous waste products, solid state waste products, biomass fuels and a mixture made of some of them, in addition to normal sulphonated petroleum oils, vegetable oils, and mineral oils, because boiler 2 and Stirling engine 4 as an external-combustion engine is characterized by being able to operated by a variety of fuels. The cogeneration system is thus structured to use waste products as fuel, and in doing so promotes the re-cycling of waste products and protection of the environment.

Moreover, the cogeneration system invention is able to promote the reduction of industrial waste products and the recycling of resources because burner unit 5 may be supplied with the aqueous emulsion fuel which is made by adding water to the base fuel substances such as a various types of virgin oils, liquid waste products, gaseous waste products, solid state waste products, biomass fuels and the mixture made of some of them. Namely, the system can be operated by the high combustion performance of the aqueous emulsion fuel and the above-mentioned characteristics of both of the boiler 2 and Stirling engine 4, even though the base fuel substances contains the waste products.

Moreover, the fuel preparation unit, which is a simple structure constructed from mixing tank 55, agitator 56 installed to mixing tank 55, emulsifier 57, ionizing unit 58, and pump 59, is able to economically prepare aqueous emulsion fuels.

Exhaust gas in the form of a gaseous state waste product may be supplied to burner unit 5 and washed through the re-combustion process. Furthermore, exhaust gas system 63, which supplies exhaust gas to burner unit 5, is structured from first and second exhaust gas ducts 64 and 65, second exhaust gas duct being directly connected to burner unit 5, and first exhaust gas duct 64 being connected to burner unit 5 through soot removing soot collector. The reliable operation of burner unit 5 is improved as a result of the soot collector removing soot from exhaust gas before said gas is supplied to burner unit 5.

The combustion gas supplied to burner unit 5 may take the form of pure oxygen gas or an oxygen-rich gas, thus making it possible to run a low NOx combustion process. Moreover, the fuel supplied to burner unit 5 may also be a mixture of oxygen and hydrogen, thus making it possible to prevent the generation of toxic pollution components through a completely clean combustion process. Other substances may, of course, be mixed in with these fuel gasses and combusted.

Moreover, burner unit 5 heats boiler 2 and heater 3 by completely combusting waste products which may be used as fuel, or aqueous emulsion fuels containing waste products. This is made possible by the structure of nozzle 33 which is able to separately spray out fuel and primary gas which are mixed external to the spray tip of nozzle 33, wind box 45, fan 38 and duct 46 which introduce a secondary gas into the fuel and primary gas mixture to impart a spinning motion to the mixture, inner cylinder 34 which serves as a fuel gasification duct for the spinning fuel and gas mixture flowing therethrough, and outer cylinder 35 which serves as an oxidation gas passage supplying oxidation gas to the discharge end of inner cylinder 34 in order to ignite and combust the fuel.

When an aqueous emulsion fuel is burned, an aqueous gas reaction is induced resulting in a continuous, stable, high-temperature explosive combustion process. Moreover, complete combustion may be obtained, even in the presence of low air reaction, as a result of the supplementation of the required oxygen. Therefore, this combustion process reduces fuel expenses by minimizing thermal loss, maintaining a dependable and economical low-energy combustion, suppressing the generation of soot through complete combustion at high temperatures, and minimizing the production of NOx, SOx, CO, Co2, and other atmospheric pollutants so as not to contribute to global warming.

Therefore, sufficient combustion heat is obtained from the aqueous gas reaction to support the operation of Stirling engine 4 which operates in a temperature range of from 750~800° C., and because thermal loss from Stirling engine 4 is extremely small, the liquid medium in boiler 2 can be heated to a sufficiently high temperature. Also, the use of aqueous emulsion fuels to cogeneration system 1 makes it possible to attain a fuel processing thermal cycle in which the previously noted multiple types of low grade waste materials may be used as a source of thermal energy.

Moreover, burner unit 5 is made to compact dimensions by means of being structured to include a double wall cylindrical assembly of inner cylinder 34 and outer cylinder 35 which respectively serve as gasification and oxygenation gas supply ducts. Due to the process through which an oxidation gas is supplied through the outer cylinder 35 while an aqueous gasification reaction occurs at the inner cylinder 34, a complete high-temperature combustion process is made possible through an oxidation combustion reaction of high efficiency and minimal thermal loss.

Moreover, the combustion taking place in combustion chamber 11 eliminates the need for the normally used exhaust gas processing induction fan in exhaust duct 16.

Figure 7:
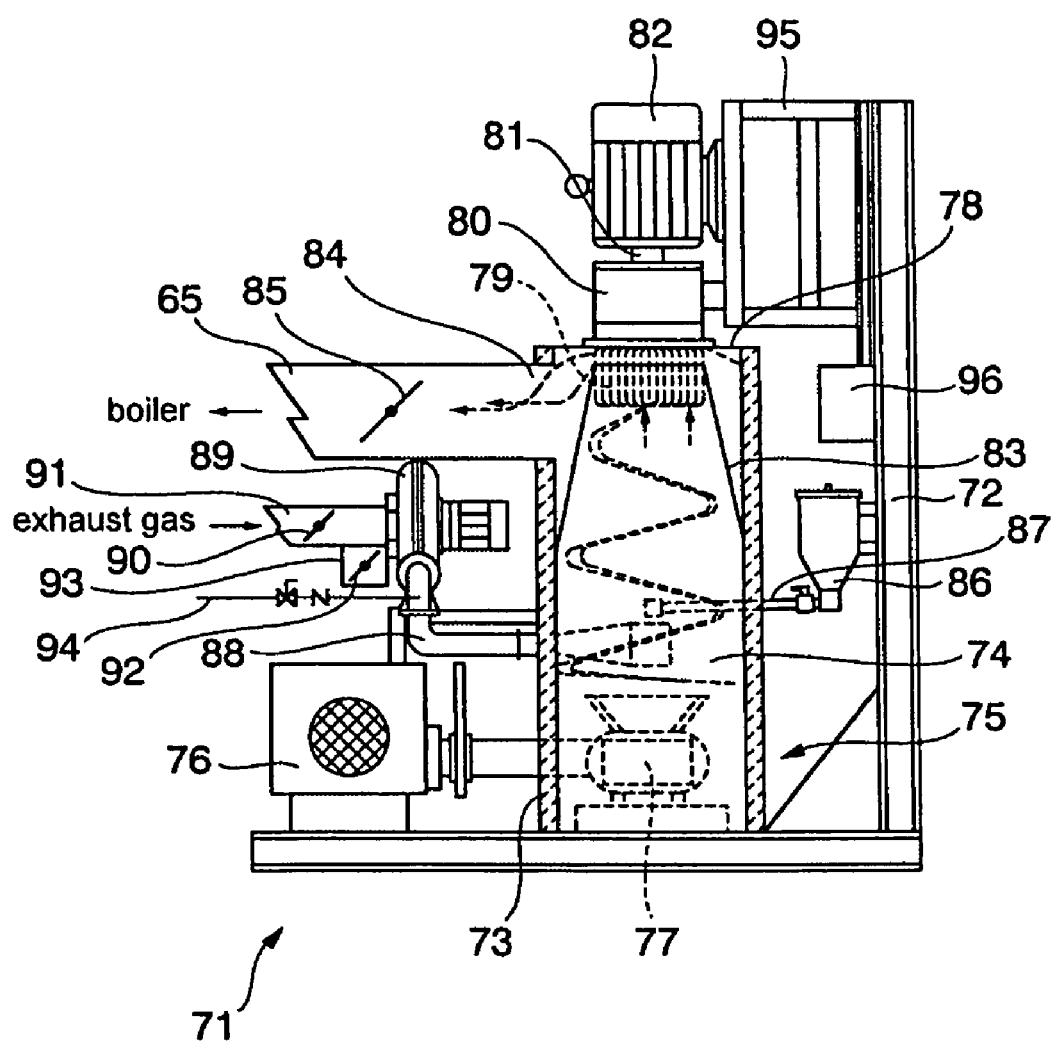
FIG. 7 is a side view cross section of the heating furnace which may be used by the FIG. 1 cogeneration system.

FIG. 7 illustrates heating furnace 71 which may be preferably assembled with the previously described cogeneration system 1 embodiment. Heating furnace 71 is connected to exhaust gas system 63, for example to second exhaust gas duct 65 to heat the exhaust gas therethrough.

Heating furnace 71 is primarily structured from;

equipment supporting frame structure 72;

vertical housing 75 which is attached to frame structure 72, forms combustion chamber 74 through which exhaust gas flows, and to which thermal accumulator 73 having a flame and corrosion resistant property is installed at the internal surface thereof;

vortex flame burner 77 installed within vertical housing 75, burner 77 operating to combust exhaust gasses while imparting a vortex-like spinning flow pattern to the combustion flame which is blown upward, along with combustion air, by fan 76 which is attached to the external part of vertical housing 75;

Stirling engine 80 installed in a vertical orientation above top plate 78 of vertical housing 75, heater 79 of Stirling engine 80 being disposed within combustion chamber 74 facing vortex flame burner 77;

electrical generator 82 which is connected to the output shaft 81 of Stirling engine 80;

cone member 83 which is installed within the upper region of combustion chamber 74, the inner surface of cone member 83 extending toward heater 79 to form a constricting cone-like structure which accelerates exhaust gas blown toward heater 79;

exhaust gas port 84 which is formed at the upper region of vertical housing 75 and connects to the open space between cone member 83 and top plate 78, and which directs the exhaust gas to second exhaust gas duct 65;

adjustment valve 85 which is installed in the vicinity of exhaust gas port 84 and which is controllably opened and closed to adjust the exhaust gas flow rate to maintain an approximately uniform temperature within combustion chamber 74;

preheating tank 86 which is installed external to vertical housing 75 and which stores and pre-heats the fuel supplied to vortex flame burner 77 by accumulating heat radiated from vertical housing 75;

oil supply pipe 87 which is connected to preheating tank 86, runs through vertical housing 75, extends above and faces vortex flame burner 77, and drops fuel, supplied from preheating tank 86, down onto flame burner 77 by operation of the cock;

heat resistant gas supply fan 89 which is attached to vertical housing 75, and which blows exhaust gas from another process into the internal region of vertical housing 75 through supply duct 88 whose opening is located between vortex flame burner 77 and oil supply pipe 87;

exhaust gas intake duct 91 which supplies exhaust gas from another process to fan 89 through adjusting valve 90;

temperature adjusting duct 93 which is connected to exhaust gas intake duct 91, duct 93 being equipped with adjusting valve 92 which directs air into the flow of exhaust gas in order to adjust the exhaust gas temperature; and oxygen supply duct 94 which connects to supply duct 88 and supplies a required amount of oxygen, from an oxygen condenser, which mixes in with the exhaust gas as means of inducing high-temperature oxygen-rich combustion.

Stirling engine 80 and electrical generator 82 are able to slide vertically upward or downward on frame structure 72 through sliding base 95. Furthermore, top plate 78 is structured as a cover removably attached to the top of vertical housing 75 in which heater 79 is installed. Removing top plate 78 and lifting up sliding base 95 along frame structure 72 allows access to heater 79 which can be pulled out of combustion chamber 74 for maintenance work. Furthermore, stopper 96 is provided on frame structure 72, to limit the downward travel of sliding base 95.

In heating furnace 71, vortex flame burner 77 combusts the fuel, combustion air, exhaust gas, and if necessary, oxygen which results in the generation of thermal energy and exhaust gas which is applied to heater 79 to drive Stirling engine 80 which in turn powers electrical generator 82 to generate electricity while combustion-heated high temperature exhaust gas is concurrently supplied to burner unit 5 through exhaust gas system 63. Supplying this large amount of thermal energy and high-temperature exhaust gas to burner unit 5 allows the combustion process to operate with a high degree of combustion efficiency. In cases where little heat is applied to burner unit 5, the addition of an exhaust gas makes it possible for cogeneration system 1 to operate with high efficiency. Furthermore, by using burner 77 to heat the exhaust gas, an exhaust gas combustion process is enabled which makes it possible to remove, or "wash" undesirable components from the exhaust gas.

Heating furnace 71 may incorporate Stirling engine 80 to drive electrical generator 82, thus making heating furnace 71 electricity generating cogeneration system in itself. More specifically, it becomes possible to maintain the exhaust gas supplied to burner unit 5, from combustion chamber 74, at a high temperature due to the high efficiency and minimal thermal loss with which a Stirling engine operates. Also, cone member 83 in combustion chamber 74 collects and focuses the exhaust gas on heater 79, and therefore thermal energy is efficiently transferred to heater 79 to assure that Stirling engine 80 is able to operate with a high degree of efficiency.

Removing top plate 78 of vertical housing 75 exposes heater 79 to the region external to combustion chamber 74, thus allowing maintenance to be performed on heater 79 in an easily accessible position.

The method through which fuel is supplied to vortex flame burner 77 of heating furnace 71 is, in the same manner as previously described in regard to the fuel supplied to burner unit 5, designed to promote the recycling and reduction of waste products in order to contribute to environmental conservation. Heating furnace 71 is able to pre-heat the fuel supplied therein from pre-heating tank 86, therefore heating furnace 71 is able to liquidize incoming fuel, a factor that allows the use of high viscosity fuels. In addition, a clean combustion process is assured by supplying burner 77 with a combustion gas such as oxygen gas, oxygen-rich gas, or a mixture of oxygen and hydrogen gas from oxygen supply duct 94 in the same manner as previously described in regard to burner unit 5. Other substances may, of course, be mixed into the aforesaid gasses.

Figure 8:
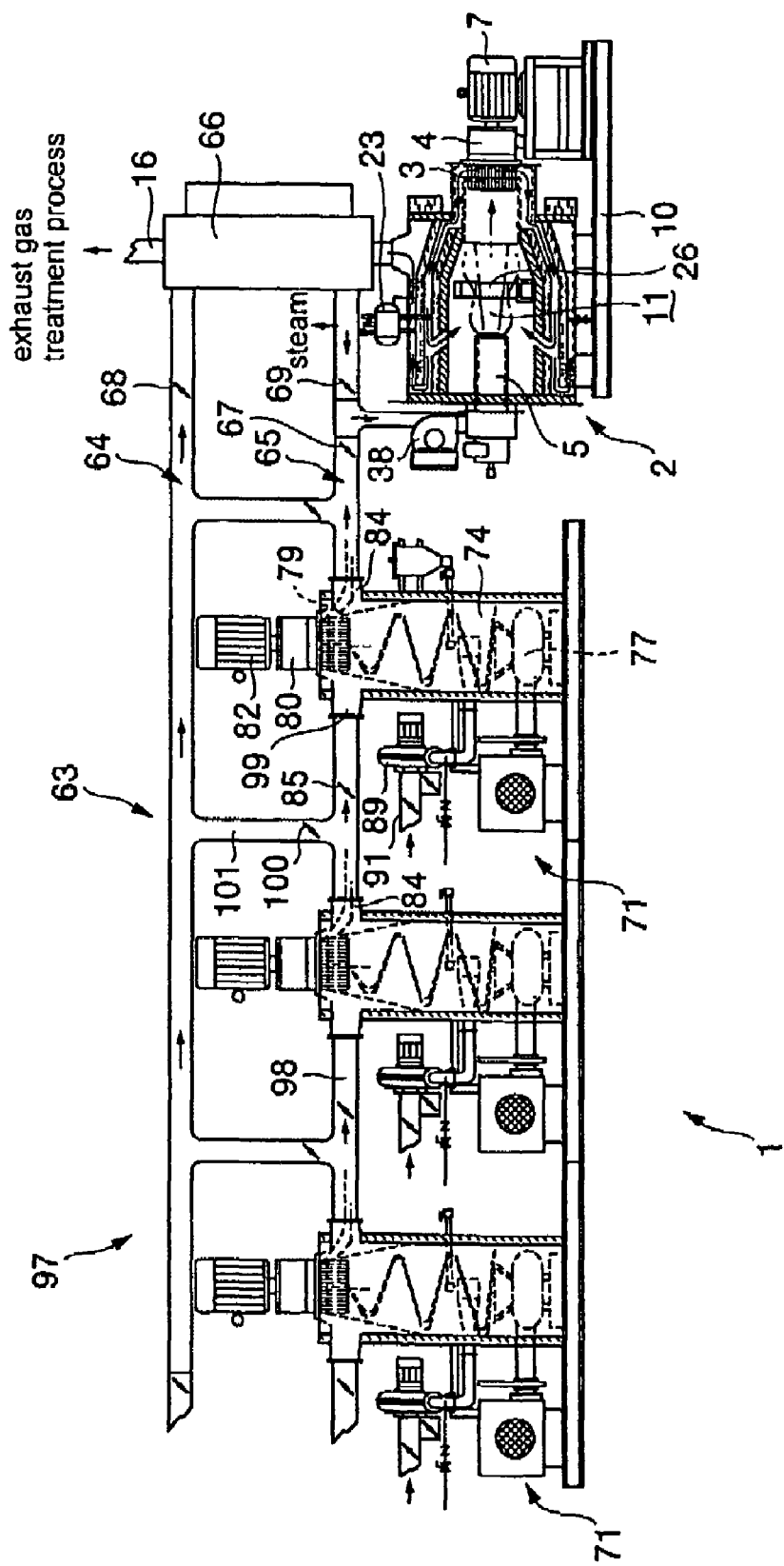
FIG. 8 is a system drawing of the thermal plant which may be used by the FIG. 1 cogeneration system.

FIG. 8 illustrates an embodiment of cogeneration system 1 in the form of thermal plant 97 structured from an array of multiple heating furnaces 71 (each furnace 71 shown in detail in FIG. 7) joined in an inline configuration by connecting duct 98, thus making it possible to heat each of the exhaust gas generated by other plants individually and to process said exhaust gas through multiple heating cycles.

As FIG. 8 illustrates, the upper portion of each heating furnace 71 incorporates a gas supply port 99 opposing an exhaust gas port 84, the exhaust gas port 84 of each heating furnace 71 being connected to the gas supply port 99 of the adjacent heating furnace 71 by connecting duct 98, thus forming a structure allowing the exhaust gas discharged from each heating furnace 71 to flow from an upstream side to a downstream side therebetween. Second exhaust gas duct 65 is formed by the connection of exhaust gas port 84 of the last downstream heating furnace 71 to high-flow fan 38 of burner unit 5 through connecting duct 98, and the connection of all heating furnaces 71 through connecting duct 98.

Therefore, thermal plant 97 includes the aforesaid first exhaust gas duct 64, which is provided as a bypass duct bypassing each heating furnace 71, in addition to second exhaust gas duct 65. A stop valve 100 is installed in each connecting duct 101 installed between the first and second exhaust gas ducts 64 and 65 between each heating furnace 71, and in the connecting duct 101 located between heating furnace 71 and burner unit 5.

Firstly, by opening each adjustment valve 85 in second exhaust gas duct 65, and by closing each stop valve 100 in each connecting duct 101, the exhaust gas flow is routed through the second exhaust gas duct 65 and thus through each heating furnace 71. Secondly, by closing any of the adjustment valves 85 in second exhaust gas duct 65, and by opening a stop valve 100 in connecting duct 101 on the upstream side of the closed adjustment valve 85, it becomes possible to route the flow of exhaust gas, through the operation of an upstream heating furnace 71, from the second exhaust gas duct 65 to first exhaust gas duct 64. Thirdly, even when the exhaust gas flow is routed from second exhaust gas duct 65 to first exhaust gas duct 64, closing second stop valve 68 on the intake side of heat exchanger 66, while a stop valve 100 in connecting duct 101 is open, makes it possible to route the flow of exhaust gas back to second exhaust gas duct 65.

In other words, the selective operation of valves 85 and 100 in connecting ducts 98 and 101, along with the selective operation of the aforesaid first, second, and third stop valves 67, 68, and 69, makes it possible to control the number of heating furnaces 71 to which exhaust gas is supplied, that is, to route the flow of exhaust gas around a specific heating furnace 71 if desired, thus allowing maintenance and repair work to be done on the bypassed heating furnace 71 without interrupting the continuing operation of thermal plant 97. Therefore, when the temperature of the exhaust gas supplied to burner unit 5 is too low and must be raised, the exhaust gas flow may be routed through the required number of heating furnaces 71 through second exhaust gas duct 65 and heated by each vortex flame burner 77. Conversely, when the exhaust gas temperature is effectively high, the exhaust gas flow may be routed around a heating furnace 71 through first exhaust gas duct 64. Therefore, in cases where the exhaust gas contains a large amount of debris, first stop valve 67 may be closed to route the gas flow through first exhaust gas duct 64.

Providing thermal plant 97 as means of heating the exhaust gas flowing through exhaust gas system 63, and structuring thermal plant 97 to include multiple heating furnaces 71 connected in series through connecting ducts 98, makes it possible to maintain the exhaust gas, which is cooled as it travels through exhaust gas system 63, at the required high temperature constantly, to raise the thermal volume of the exhaust gas supplied to burner unit 5, and to have burner unit 5 generate a highly efficient combustion process. Also, this structure makes it possible to divert exhaust gas from heating furnace 71 through first exhaust gas duct 64 which serves as a bypass duct, to run or to shut down each heating furnace 71 as desired, to determine how many heating furnaces 71 will operate, and to keep cogeneration system 1 running even when one or more of the heating furnaces 71 are shut down for maintenance or repair work.

Therefore, thermal plant 97 may also be applied as a cogeneration system able to generate electricity by having Stirling engine 80 drive electrical generator 82. Thermal plant 97 makes it possible to maintain the temperature of the exhaust gas supplied to burner unit 5 due to the Stirling engine's high operating efficiency and low thermal loss, to simultaneously generate electricity through the multiple Stirling engines 80 powered by the combustion heat and exhaust gas produced by the vortex flame burner 77 of each heating furnace 71, and lastly to drive Stirling engine 4 through the operation of boiler 2 while concurrently recycling thermal energy, through the liquid medium, to a thermal utilization plant.

Also, it is preferable that heating furnace 71 and thermal plant 97 (which is equipped with multiple heating furnaces 71) send the coolant, which has been heated by the operation of the regenerator of Stirling engine 80, to another thermal utilization process, thus providing a process able to effectively use the discharge heat from Stirling engine 4 as thermal energy.

Figure 9:
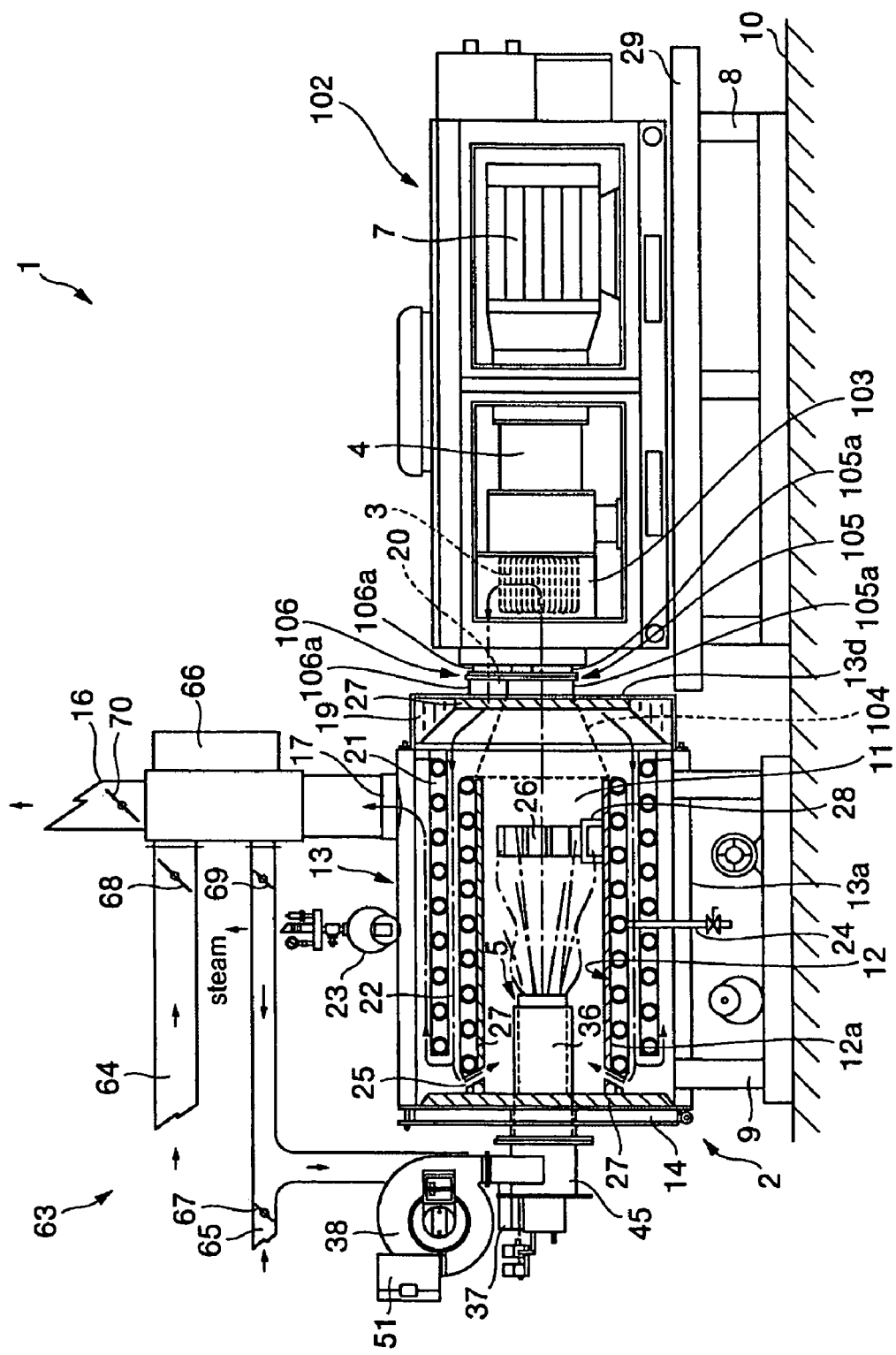
FIG. 9 is a cross section of another preferred embodiment of the cogeneration system invention.

FIG. 9 illustrates another preferred embodiment of cogeneration system 1. In this embodiment of cogeneration system 1, Stirling engine 4 (which includes heater 3) and electrical generator 7 are installed in casing 102, and heater 3 is located in cavity 103 defined within casing 102.

As a result of this embodiment placing heater 3 within casing 102, combustion chamber 11 is formed into partitioned regions which include cavity 103, large diameter part 12a of inner cylinder 12, constricting cone part 104 put in place of cone 12b and separately structured large diameter part 12a, and first duct 105 which connects boiler 2 and casing 102 through a passage formed between cone part 104 and cavity 103, first duct 105 and cavity 103 form a structure which corresponds to small diameter part 12b of inner cylinder 12 described in the previous embodiment. As a result, a single combustion chamber 11 (which is enveloped by liquid media jacket 21 and heated by combustion from burner unit 5) extends from large diameter part 12a of inner cylinder 12 up to cavity 103 via first duct 105. To explain further, combustion chamber 11 is formed as a continuing chamber extending from outer cylinder 13 up to casing 102. In other words, casing 102 divides combustion chamber 11 into compartments. Furthermore, first duct 105 is formed as a pair of mutually disconnectable duct members 105a, one of which is an extending part opposing end wall 13d of outer cylinder 13 (end wall 13d being used in place of step wall 13c), and the other as an extending part opposing casing 102.

Moreover, this embodiment eliminates small diameter part 13b of outer cylinder 13 in the previous embodiment, and replaces exhaust gas flow channel 20 (which, in the previous embodiment, connects the region around heater 3 with exhaust gas passage 22) with second duct 106 which connects cavity 103 on the casing 102 side with exhaust gas passage 22 on the outer cylinder 13 side. Second duct 106 is also structured from a pair of duct members 106a, one of which is formed as an extending part opposing end wall 13d of outer cylinder 13, and the other as an extending part opposing casing 102.

Furthermore, in addition to eliminating small diameter part 13b of outer cylinder 13 which houses heater 3 in the previous embodiment, this embodiment also eliminates end plate 15 of the previous embodiment, provides an assembled structure of first and second ducts 105 and 106 whose disconnection allows the separation of outer cylinder 13 from casing 102. First and second ducts 105 and 106 connect the internal space of combustion chamber 11 to the space around heater 3, and thus place heater 3 within combustion chamber 11. End plate 15, which served as a lid in the previous embodiment, is replaced by casing 102 which, in this embodiment, contains heater 3 and functions as the lid of combustion chamber 11. Therefore, casing 102 may be movably mounted to framework 8 through slide rails 29. Ducts 105 and 106 may be separated and casing 102 slidably moved on framework 8 in a direction away from combustion chamber 11 in order to expose heater 3 for maintenance work.

This embodiment provides the same operational effects as the previous embodiment, and may, of course, be used together with heating furnace 71 described in FIG. 7 and thermal plant 97 described in FIG. 8. Even though Stirling engine 4, which includes heater 3, is completely housed within casing 102, in case casing 102 may partition combustion chamber 11 into compartment, heater 3, though housed in casing 102, is still able to be placed within combustion chamber 11.

The Stirling engines 4 and 80 described in these embodiments operate through the heating of heaters 3 and 79, and need not be of any specific structure or shape. Furthermore, it is preferable that the operation of the gas supplying devices, such as the oxygen condenser, be used in the late evening when the price of electricity is reduced.

The cogeneration system described by the invention is equipped with a Stirling engine heater located within a combustion chamber, the internal region of the combustion chamber being heated by combustion generated by a burner, and a liquid medium jacket enveloping the combustion chamber. The exhaust gas generated by the burner-driven combustion flows against the Stirling engine heater which is located in a position opposing the burner, and then flows through an exhaust gas flow channel into an exhaust gas passage which transfers thermal energy to the liquid medium in the liquid medium jacket. Therefore, the exhaust gas from a single combustion chamber is able to simultaneously transfer thermal energy to both the heater and liquid medium which can be applied to a thermal utilization process. This structure is able to transfer thermal energy from burner-generated combustion to both the heater and liquid medium without employing space, time, or mechanically based heat transfer means, thus making it possible to transfer thermal energy with high efficiency and no thermal loss, and to drive a highly efficient cogeneration system utilizing a thermal energy source.

This application is based on the Japanese Patent Application No. 2003-028483 filed on Feb. 5, 2003 entire content of which is expressly incorporated by reference herein.

The invention claimed is:

1. A cogeneration system, comprising:
   a combustion chamber;
   a burner installed to said combustion chamber, and inducing exhaust gas-generating combustion within said combustion chamber;
   a liquid media jacket enveloping said combustion chamber and containing a liquid medium to be flowed therethrough, the liquid medium being heated by the exhaust gas generated by said burner;
   a Stirling engine having a heater installed within said combustion chamber and disposed in opposite to said burner so as to be struck by the flow of exhaust gas in said combustion chamber, and being operated by means of being supplied a thermal energy from said heater to an operating fluid sealed therein;
   an exhaust gas flow channel discharging exhaust gas which flows toward said heater from said burner and supplies the thermal energy to said heater; and
   an exhaust gas passage having an inlet connected to said exhaust gas flow channel and directing the flow of exhaust gas along said liquid medium jacket; wherein the exhaust gas generated by burner-driven combustion flows against said heater as means of transferring the thermal energy thereto, and then flows into said exhaust gas passage, via said exhaust gas flow channel, as means of transferring the thermal energy to the liquid medium, thereby providing a mechanism through which the exhaust gas is able to simultaneously transfer the thermal energy to said heater and the liquid medium.

2. The cogeneration system of claim 1, wherein a casing is provided as means of enclosing at least said heater of said Stirling engine and defining at least one of spaces forming said combustion chamber.

3. The cogeneration system of claim 1, wherein an electrical generator is connected to an output shaft of said Stirling engine.

4. The cogeneration system of claim 1, wherein a supply device is connected to said liquid medium jacket as means of supplying the heated liquid medium to a thermal energy utilization process.

5. The cogeneration system of claim 1, wherein a heat absorbing and discharging thermal accumulator is installed within said combustion chamber.

6. The cogeneration system of claim 5, wherein said thermal accumulator is disposed in opposition to said burner as means of allowing a burner flame and exhaust gas emitted from the burner-generated combustion to strike said thermal accumulator.

7. The cogeneration system of claim 1, wherein a constricting part is installed within said combustion chamber as means of accelerating the flow of exhaust gas blown against said heater.

8. The cogeneration system of claim 1, wherein said Stirling engine is equipped with a regenerator as means of cooling the operating fluid, and a coolant heated by the operating fluid through the operation of said regenerator heats the liquid medium.

9. The cogeneration system of claim 1, wherein an open and closable door is installed to said combustion chamber as means of exposing and sealing an internal region of said combustion chamber.

10. The cogeneration system of claim 9, wherein said burner is attached to said door.

11. The cogeneration system of claim 1, wherein a removable lid is attached to said combustion chamber, and said heater of said Stirling engine is attached to said lid.

12. The cogeneration system of claim 1, wherein various types of virgin oils, liquid refuse, waste gasses, solid waste materials, biomass fuels, or mixtures of any or all of these substances are used as fuel for said burner.

13. The cogeneration system of claim 1, wherein all types of virgin oils, liquid refuse, waste gasses, solid waste materials, biomass fuels, or mixtures of any or all of these substances are used as a base fuel material to which water is added in order to make an aqueous emulsion fuel for supply to said burner.

14. The cogeneration system of claim 13, wherein the aqueous emulsion fuel is supplied to said burner from a fuel preparation unit, said fuel preparation unit comprising:
   a mixing tank incorporating an agitator which agitates and mixes the base fuel material with water and a surfactant, the resulting liquid mixture being held in said mixing tank;
   an emulsifier emulsifying the liquid mixture supplied from said mixing tank;
   an ionizing unit ionizing water molecules in the liquid mixture supplied from said emulsifier; and
   a pump circulating the liquid mixture from said mixing tank to said emulsifier, then to said ionizing unit, and then back to said mixing tank.

15. The cogeneration system of claim 1, wherein an exhaust gas system of a separate process is connected to said burner as means of re-combusting an exhaust gasses generated by said separate process.

16. The cogeneration system of claim 15, wherein said exhaust gas system is structured of two ducts, one duct being connected directly to said burner, and the other duct being connected to said burner through a washing device which removes soot and ash from the exhaust gas.

17. The cogeneration system of claim 1, wherein a combustion gas supplied to said burner is a pure oxygen gas or an oxygen rich gas.

18. The cogeneration system of claim 1, wherein the fuel supplied to said burner is a mixture of oxygen and hydrogen gas.

19. The cogeneration system of claim 1, wherein said burner includes:
   an igniter,
   a nozzle with a spraying end that separately sprays out fuel and a primary gas which mix at a location external to said spraying end,
   a secondary gas supply system that sprays a secondary gas into a mixture of fuel and primary gas as means of imparting a spinning motion to the mixture of fuel and primary gas,
   a gasification duct that gasifies the fuel in the spinning mixture of primary gas and fuel flowing therethrough, and
   an oxidizing gas supply passage which supplies oxidizing gas to an outlet of said gasification duct, in order to ignite and combust the fuel.

20. The cogeneration system of claim 19, wherein said burner includes a double wall cylindrical structure at said spraying end of said nozzle, said cylindrical structure being formed from an inner cylinder enclosed within an outer cylinder, said gasification duct being formed of a space within said inner cylinder, and said oxidizing gas supply passage being formed by a space within said outer cylinder.

21. The cogeneration system of claim 15, wherein an exhaust gas heating furnace is installed to said exhaust gas system.

22. The cogeneration system of claim 21, wherein said heating furnace is equipped with a second combustion chamber through which exhaust gas flows, and a second burner installed within said second combustion chamber as means of combusting and heating the exhaust gas.

23. The cogeneration system of claim 22, wherein the fuel supplied to said second burner is any type of virgin oils, a liquid state waste product, a gas state waste product, a solid state waste product, biomass fuel, or a mixture of any of these substances.

24. The cogeneration system of claim 22, wherein the fuel supplied to said second burner is any type of virgin oils, a liquid state waste product, a gas state waste product, a solid state waste product, biomass fuel, or a mixture of any of these substances used as a base fuel to which water is added to make an aqueous emulsion fuel.

25. The cogeneration system of claim 22, wherein a combustion gas supplied to said second burner is a pure oxygen gas or an oxygen rich gas.

26. The cogeneration system of claim 22, wherein the fuel supplied to said second burner is a mixture of oxygen and hydrogen gas.

27. The cogeneration system of claim 22, wherein said heating furnace is equipped with a second Stirling engine which has a second heater installed within said second combustion chamber and operates from a thermal energy supplied by said second heater heated by the second burner-driven combustion, an output shaft of said second Stirling engine being connected to a second electrical generator.

28. The cogeneration system of claim 27, wherein a second constricting part is installed within said second combustion chamber as means of accelerating the flow of exhaust gas therein against said second heater.

29. The cogeneration system of claim 27, wherein a second removable lid is attached to said heating furnace, and said second heater of said second Stirling engine is attached to said second lid.

30. The cogeneration system of claim 15, wherein an exhaust gas heating thermal plant is installed to said exhaust gas system, said thermal plant comprising a plurality of heating furnaces mutually interconnected by ducts in an inline configuration.

31. The cogeneration system of claim 30, wherein said thermal plant, in addition to said ducts interconnecting a plurality of heating furnaces in the inline configuration, is equipped with bypass ducts, each bypass duct bypassing each heating furnace.

32. The cogeneration system of claim 30, wherein at least one of said plurality of heating furnaces is equipped with a Stirling engine which has a heater to be heated and operates from a thermal energy supplied by said heater, an output shaft of said Stirling engine being connected to an electrical generator.

* * * * *